United States Patent
Cho et al.

(10) Patent No.: US 8,970,973 B2
(45) Date of Patent: Mar. 3, 2015

(54) LENS ACTUATING DEVICE

(71) Applicant: Wah Hong Industrial Corp., Kaohsiung (TW)

(72) Inventors: Ying-Chi Cho, Tainan (TW); Li-Te Kuo, Taoyuan County (TW)

(73) Assignee: Wah Hong Industrial Corp., Kaohsiung (TW)

( * ) Notice: Subject to any disclaimer, the term of this patent is extended or adjusted under 35 U.S.C. 154(b) by 41 days.

(21) Appl. No.: 13/946,758

(22) Filed: Jul. 19, 2013

(65) Prior Publication Data

US 2014/0226224 A1    Aug. 14, 2014

(30) Foreign Application Priority Data

Feb. 8, 2013    (TW) .............................. 102105278 A

(51) Int. Cl.
  *G02B 7/02*    (2006.01)
  *G02B 7/08*    (2006.01)
(52) U.S. Cl.
  CPC ........................................ *G02B 7/08* (2013.01)
  USPC ........................................ 359/823; 359/824

(58) Field of Classification Search
  USPC .................................................. 359/823, 824
  See application file for complete search history.

(56) References Cited

FOREIGN PATENT DOCUMENTS

| TW | 200848912 A | 12/2008 |
|----|-------------|---------|
| TW | I343165 | 6/2011 |
| TW | M443190 | 12/2012 |

*Primary Examiner* — Jack Dinh
(74) *Attorney, Agent, or Firm* — Li&Cai Intellectual Property (USA) Office

(57) ABSTRACT

A lens actuating device includes a fixed member, an adjustable member, a driving unit and a movable support unit. The adjustable member is movably disposed in the fixed member along an optical axis, and has a lens module disposed therein. The driving unit is disposed between the fixed member and the adjustable member to provide a driving force for the adjustable member. The movable support unit is disposed at one side of the adjustable member opposite to the driving unit and has a first guiding structure formed on an inner side of the fixed member parallel to the optical axis, a second guiding structure, and a plurality of rolling members. The rolling members are configured into two rows and are disposed between the first and second guiding structures to fix the seconding guiding structure such that the displacement of the adjustable member is constrained along the optical axis.

15 Claims, 6 Drawing Sheets

LENS ACTUATING DEVICE

BACKGROUND OF THE INVENTION

1. Field of the Invention

The instant disclosure relates to a lens actuating device; in particular, to a lens actuating device that is applicable to actuate optical lens.

2. Description of Related Art

Conventional camera lens actuator modules use a magnetic element and a conductive coil respectively disposed on a lens module and a base. After the magnetic and electric field generated by the magnetic element and the conductive coil have interacted, a driving force is generated along an optical axis that drives the lens module to focus according to Fleming's left hand rule. The instant applicant disclosed an optical device, Taiwanese patent no. I343165, in which the optical device has a lens, a coil disposed around the lens, a magnetic member, and a guide bar arranged between the lens and the coil. The lens is guided by the guide bar and driven by a driving force provided by the coil and the magnetic member to move back and forth along an optical axis. However, the radial arrangement of the coil and the magnetic member occupies a relatively large volume of space.

Because of the above issues, the applicant provides the instant disclosure (Taiwanese application no. 101115361—not yet published) to improve the structure of the guide rod configuration in order to save space and provide convenient assembly. However, for the spirit of striving for excellence, the instant disclosure is presented to also provide accurate displacement of the lens along the optical axis without minor lateral offsets.

To address the above issues, the inventor strives via associated experience and research to present the instant disclosure, which can effectively improve the limitation described above.

SUMMARY OF THE INVENTION

The object of the instant disclosure is to provide a lens actuating device that facilitates the lens to accurately move along the direction of an optical axis without causing lateral offset and also to facilitate assembly.

In order to achieve the aforementioned objects, according to an embodiment of the instant disclosure, a lens actuating device is provided which includes a fixed member, an adjustable member, a driving unit, and a movable support unit. The adjustable member is movingly disposed in the fixed member along the optical axis and has a lens module. The driving unit provides a driving force for the adjustable member and is disposed between the fixed member and the adjustable member. The movable support unit is arranged at another side of the adjustable member opposite to the driving unit. The movable support unit includes a first guiding structure arranged at the inner side of the fixed member parallel to the optical axis, a second guiding structure arranged at the periphery of the adjustable member corresponding to the first guiding structure, and a plurality of rotable rolling members. The rolling members resemble two columns and abut the second guiding structure to constrain the displacement of the adjustable member parallel to the optical axis, and to prevent lateral offset towards or away from the driving unit.

The instant disclosure has the following improvements. When forces are applied in directions other than the normal displacement of lens assembly, two columns of rolling members which are abutted by the second guiding structure can offset the forces through the lens actuating device of the instant disclosure. As a result, the adjustable member remains stable and parallel displacement along the optical axis.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplarities for the purpose of further explaining the scope of the instant disclosure. Other objectives and advantages related to the instant disclosure will be illustrated in the subsequent descriptions and appended drawings.

$1^{st}$ Embodiment

Figure 1:
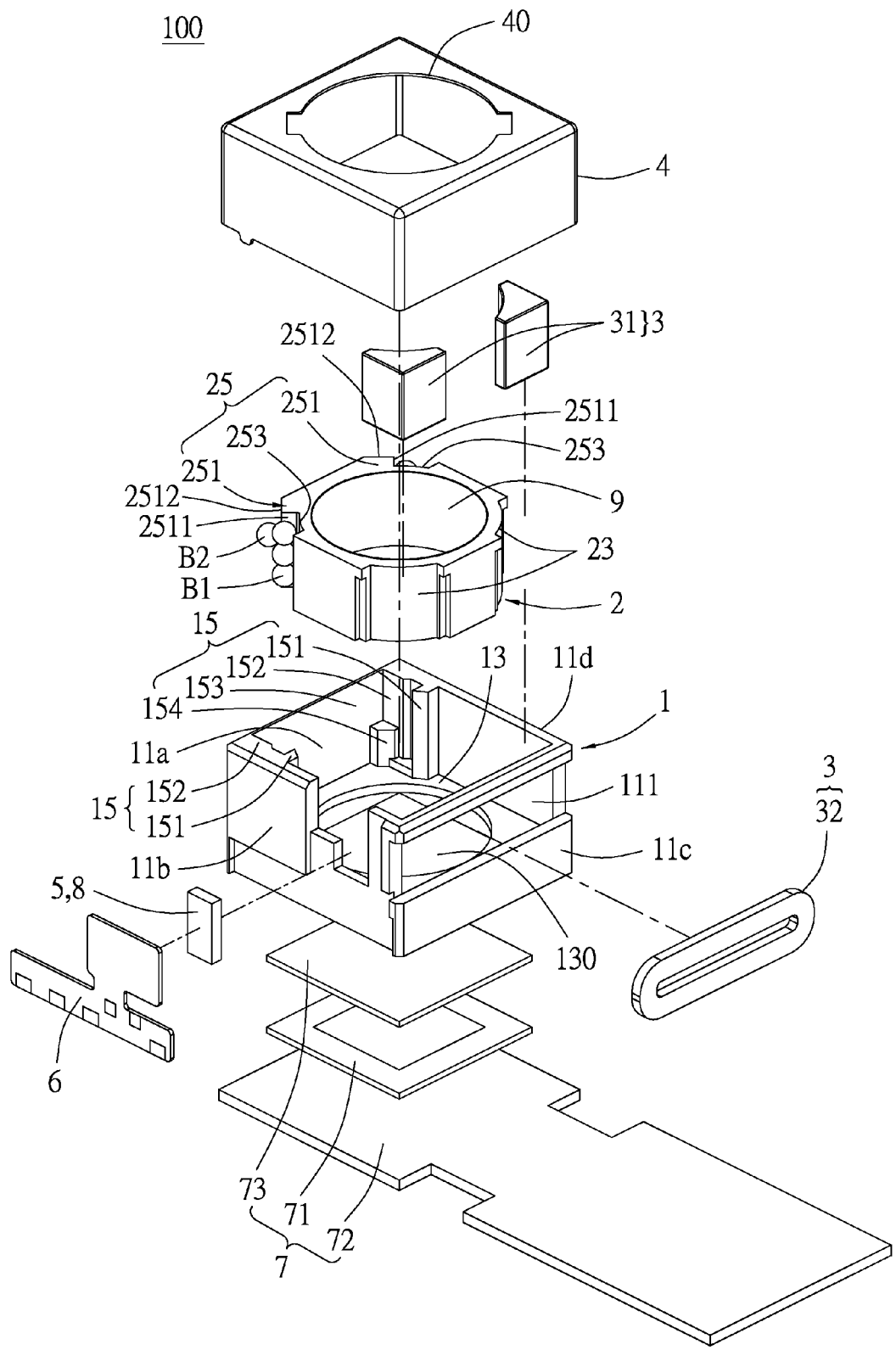
FIG. 1 is an exploded view illustrating the lens actuating device of the instant disclosure.
Figure 2:
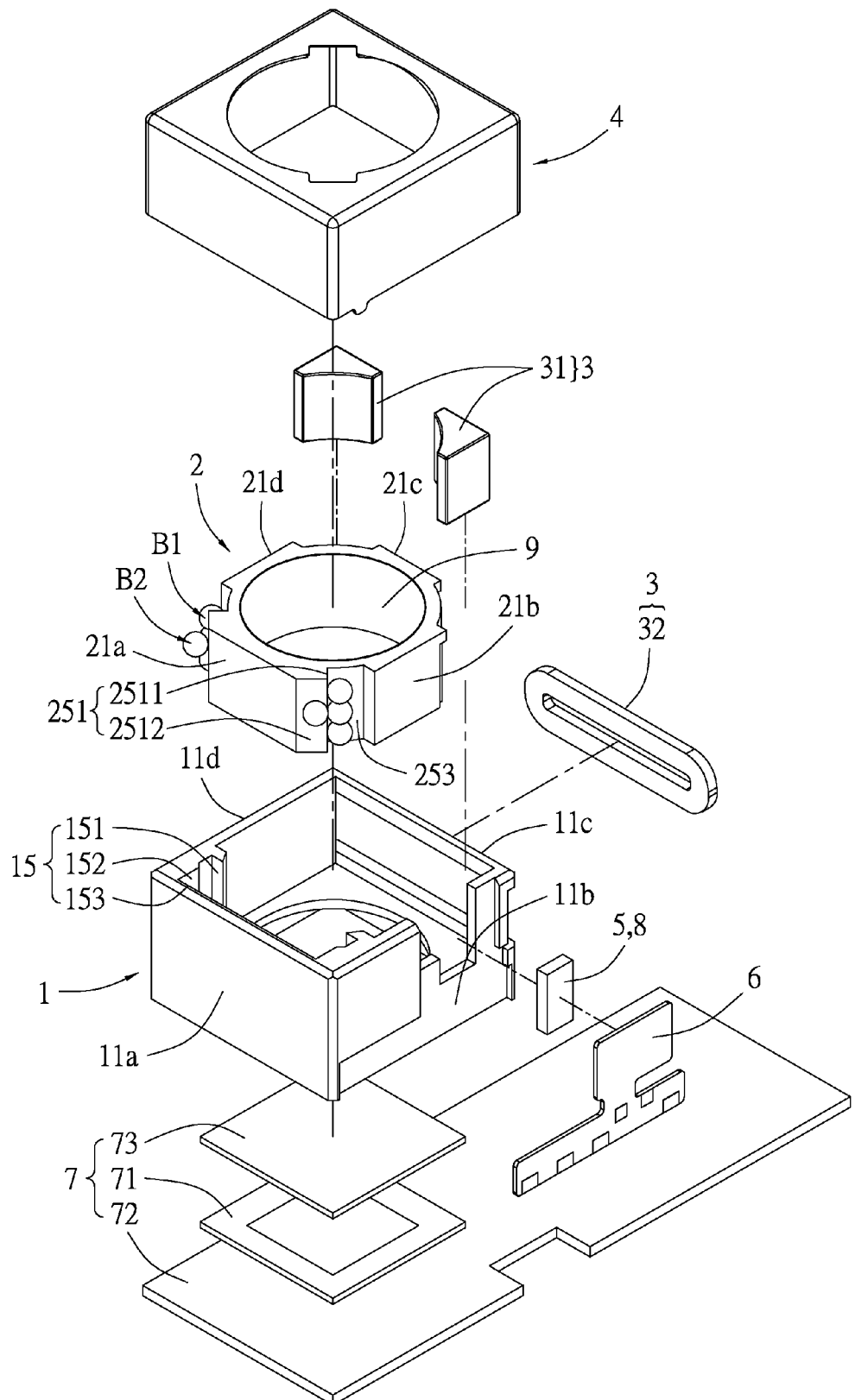
FIG. 2 is another exploded view illustrating the lens actuating device of the instant disclosure.

Please refer to FIGS. 1 and 2 as the exploded view illustrating a lens actuating device of the instant disclosure. The lens actuating device 100 includes a fixed member 1, an adjustable member 2, a driving unit 3 that provides a driving force to the adjustable member 2, a movable support unit that guides the displacement of the adjustable member 2 to strictly along an optical axis, a cover 4, a position sensing member 5, and a lateral traction member 6. The adjustable member 2 is movingly disposed in the fixed member 1 along the optical axis. The adjustable member 2 has a lens module 9 disposed therein. The driving unit 3 is disposed between the fixed member 1 and the adjustable member 2. The optical axis is referred to as the axis of the lens module 9.

In the instant embodiment, the adjustable member 2 and the lens module 9 have to accurately move along the optical axis without minor lateral displacement offsets or tilting. Therefore, a pair of movable support unit is provided. The movable support unit (as exemplary illustrated by 15 and 25) and the driving unit 3 are oppositely arranged on the adjustable member 2. Each movable support unit includes a first guiding structure 15, a second guiding structure 25, and a plurality of rolling spheres B1, B2 disposed between the first guiding structure 15 and the second guiding structure 25. The first guiding structure 15 is formed at the inner side 153 of the fixed member 1 and parallel to the optical axis. The second guiding structure 25 is formed at the periphery of the adjustable member 2 which corresponds to the first guiding structure 15. In other words, the first guiding structure 15, the second guiding structure 25, and the plurality of spheres B1, B2 define the movable support unit. The spheres B1, B2 are the rolling members in the instant embodiment, however, depending on the structure design, the rolling members can be cylinders or any other interchangeable rolling elements.

Notably, a portion of the first guiding structure 15 in the instant disclosure extends to the second guiding structure 25 and cooperates with the driving unit 3 jointly abutting the spheres B1, B2 therebetween. The spheres B1, B2 form two columns abutting the second guiding structure 25 to constrain the adjustable member 2 to move along the optical axis and prevent moving towards or away from the driving unit 3. Through the aforementioned configuration, lateral offsets in displacements of the adjustable member 2 toward or away from the driving unit 3 are therefore constrained such that the lens module 9 accurately moves along the optical axis. Further details are disclosed below.

The fixed member 1 substantially resembles a square (or quadrilateral shape) and includes a first sidewall 11a, a second sidewall 11b, a third sidewall 11c, and a fourth sidewall 11d sequentially connected. The second sidewall 11b and the fourth sidewall 11d are oppositely arranged. The pair of first guiding structures 15 is respectively formed at the first sidewall 11a, second sidewall 11b, and fourth sidewall 11d. The bottom portion of the fixed member 1 also includes a bottom plate 13 to constrain the adjustable member 2. The bottom plate 13 is formed with a light opening 130 in the center thereof. The diameter of the light opening 130 is smaller than the diameter of the adjustable member 2 such that the adjustable member 2 is constrained and stopped by the bottom plate 13 during the descent towards the bottom plate 13. Portions of the bottom plate 13 that contact the adjustable member 2 are not limited to the instant embodiment as long as the adjustable member 2 is constrained as aforementioned.

The adjustable member 2 is substantially cylindrical and disposed in the fixed member 1. The adjustable member 2 is installed with a lens module 9 and can move along the optical axis such that the lens module 9 can focus. The periphery of the adjustable member 2 is formed with a pair of magnet housing slots 23 opposite to the second guiding structure 25. Moreover, four sides of the adjustable member 2 outwardly protrude to respectively form four flat walls 21a, 21b, 21c, 21d as shown in FIG. 2.

The driving unit 3 is disposed between the fixed member 1 and the adjustable member 2 and provides a driving power of the adjustable member 2. The driving unit 3 includes a pair of magnets 31 and a coil 32. The pair of magnets 31 is fixed about the adjustable member 2. The coil 32 is fixed about the fixed member 1. In the instant embodiment, the pair of magnets 31 substantially resembles triangular prisms. The magnets 31 are fixed at the outer surface of the adjustable member 2 opposite to the second guiding structure 25. The magnets 31 are respectively disposed at the pair of magnet housing slot 23 of the adjustable member 2. The coil 32 is fixed at the third sidewall 11c of the fixed member 1. The third sidewall 11c of the instant disclosure is formed with a rectangular shaped opening 111, in which the coil 32 is disposed therein.

The configuration in the instant disclosure is specifically notable in four corners of the instant embodiment that are defined between the adjustable member 2 and the fixed member 1. The movable support units (as exemplary illustrated by 15 and 25) are arranged on two sides of the adjustable member 2 opposite to the driving unit 3. In the instant embodiment, the movable support units are respectively configured at two corners and the driving unit 3 is configured at the other two corners. With the configuration between the square shaped fixed member 1 and the cylindrical shaped adjustable member 2, the corners can conveniently provide spacing for the triangular prism shaped magnets 31. Moreover, the pair of movable support units (as exemplary illustrated by 15 and 25) is arranged opposite from the magnets 31 using the spacing mentioned above. The aforementioned configuration saves space and, specifically, can retain adjustable member 2 with a larger diameter than the instant embodiment within the same amount of space. Thus, lens module 9 with a larger diameter can be retained in the adjustable member 2 such that relatively better optical performance can be provided. In other words, a lens module 9 of a certain diameter can be retained in a relatively smaller structural volume which is advantageous to the miniaturization of camera systems. The respective quantity of the magnet and the coil can be at least one.

Figure 3:
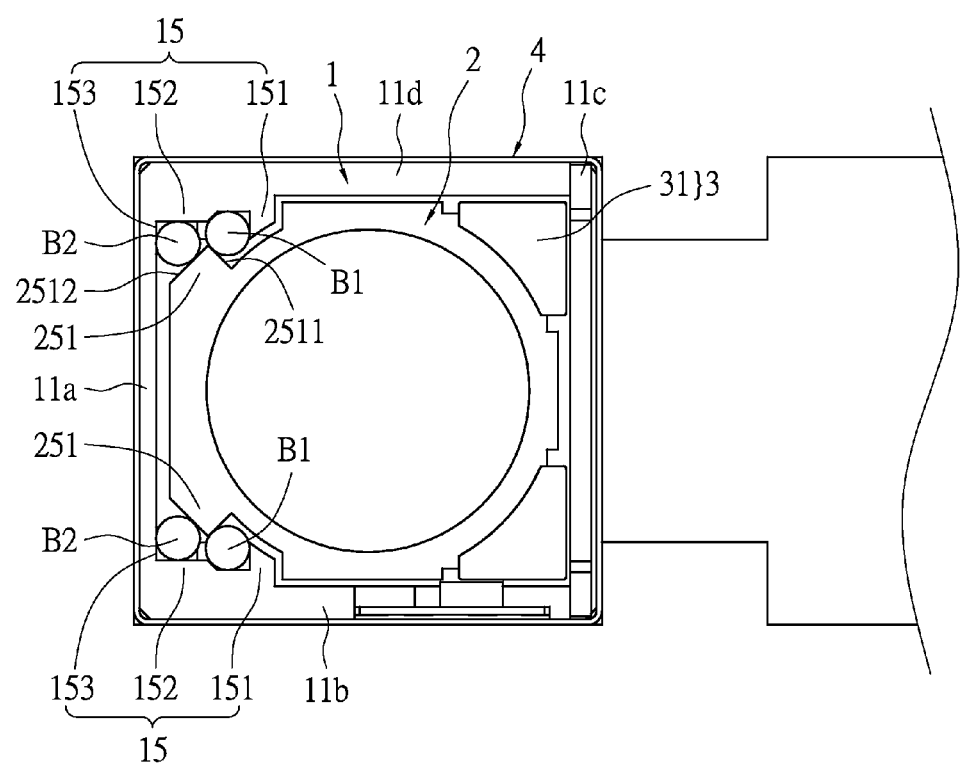
FIG. 3 is a top view illustrating the lens actuating device (without the cover) of the instant disclosure.

Please refer to FIGS. 1 and 3. FIG. 3 is a top view illustrating the lens actuating device (without the cover) of the instant disclosure. The pair of first guiding structures 15 each includes an outer protrusion 151. The outer protrusions 151 respectively extend from the second sidewall 11b and the fourth sidewall 11d to the adjustable member 2 and are arranged between the driving unit 3 and the spheres B1, B2.

The pair of second guiding structures 25 each includes an inner protrusion 251 formed between the outer protrusion 151 and the first sidewall 11a and a groove 253 arranged on a side of the inner protrusion 251. In the instant embodiment, the quantity of sphere B1 can be more than two and preferably at least three. The spheres are stacked according to the optical axis and are disposed between the outer protrusion 151 and the inner protrusion 251. The groove 253 is configured parallel to the optical axis and retains the outer protrusion 151 and the spheres B1. The pair of grooves 253 is substantially arranged opposite to the magnet housing slots 23 and proximate to the four corners of the adjustable member 2. In other words, the four corners are defined between the square shaped fixed member 1 and the cylindrical shaped adjustable member 2.

The pair of first guiding structures 15 each further includes an auxiliary protrusion 152. The auxiliary protrusions 152 respectively extend from the second sidewall 11b and the fourth sidewall 11d of the fixed member 1 to the adjustable member 2 and are arranged between the inner protrusion 251 and the first sidewall 11a to jointly abut the corresponding spheres B2. Spheres B2 play an auxiliary role in which the number of spheres can be at least one. The first guiding structure of the instant embodiment further includes a stopper 154, in which a portion of the stopper 154 outwardly extends from the auxiliary protrusion 152 and connects the first sidewall 11a. The top surface of the stopper 154 provides supplementary constraining to the spheres B2. The first guiding structures 15 of the instant embodiment with the inner side 153 of the first sidewall 11a, the outer protrusions 151, and the auxiliary protrusions 152 jointly constrain the spheres B1, B2 by jointly abutting the inner protrusions 251 of the second guiding structures 25.

The auxiliary protrusion 152 is defined with an oblique surface 1521 which faces the outer protrusion 151 and opposite to the inner protrusion 251. The oblique surface 1521 and the outer protrusion 151 jointly abut the column of spheres B1.

In regards to the second guiding structure 25 of the instant embodiment, each inner protrusion 251 includes a first protrusion surface 2511. The outer protrusion 151 and the first protrusion surface 2511 jointly abut the corresponding column of spheres B2 which arranges according to the optical axis. Each first protrusion surface 2511 slantingly faces the second and fourth sidewalls 11b, 11d. Each inner protrusion 251 also includes a second protrusion surface 2512. The second protrusion 2512 and the auxiliary protrusion 152 jointly abut the corresponding column of spheres B2 which arranges along the optical axis. The second protrusion surface 2512 is slanted comparing to the first sidewall 11a. The first protrusion surface 2511 and the second protrusion surface 2512 are slanted such that the two perpendicular force vectors of the force from each of the spheres B1, B2 can be applied onto different sidewalls.

In the instant embodiment, the first protrusion surface 2511 and the second protrusion surface 2512 of each second guiding structure 25 are normal to each other. Moreover, the angle between first protrusion surface 2511 and the first sidewall 11a is about 45° and the angle between the second protrusion surface 2512 and the second sidewall 11b or the fourth sidewall 11d is about 45°. However, the aforementioned angles only pertain to one example in accordance to the instant embodiment of the instant disclosure and are not limited herein.

Figure 4:
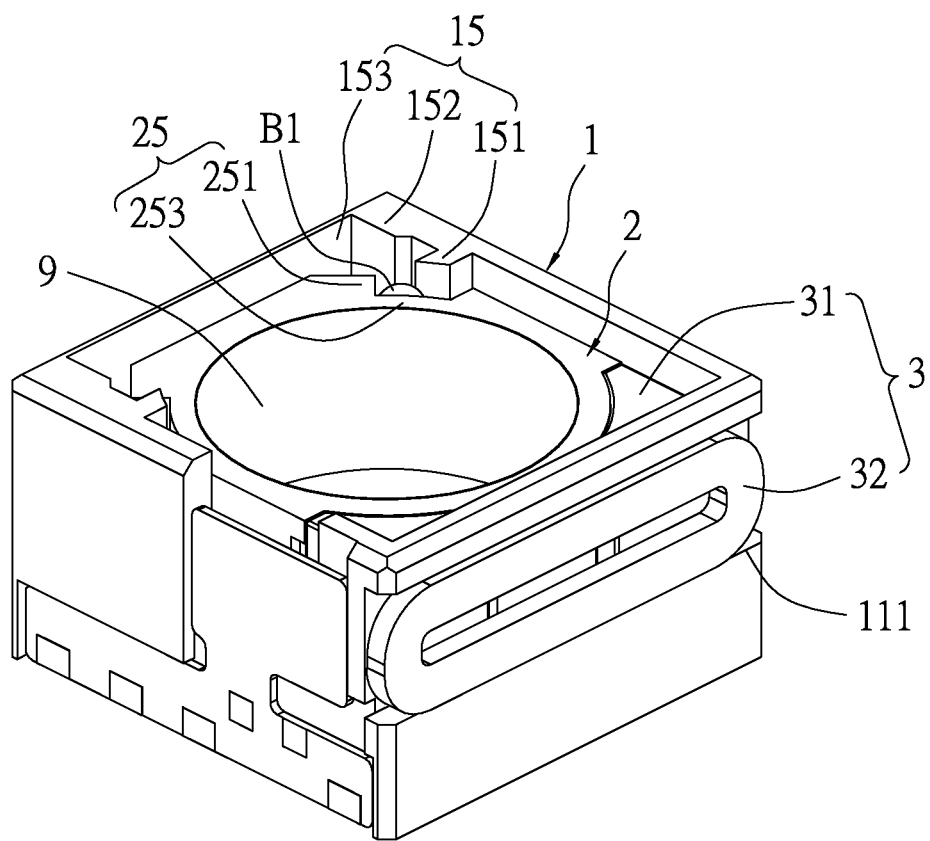
FIG. 4 is an assembled view illustrating the lens actuating device (without the cover) of the instant disclosure.

Please refer to FIGS. 1 and 4 as the perspective views illustrating the lens actuating device of the instant disclosure. The position sensing member 5 is disposed at a side of the fixed member 1 to sense the relative position of the adjustable member 2. The position sensing member 5 can be a sensing member of magnetic field changes, light intensity changes, electric field changes, or stress changes, and is not limited herein.

Moreover, the position sensing member 5 can further be modified to a position sensing and controlling unit 8 which is similarly disposed at the fixed member 1. The position sensing and controlling unit 8 can detect the relative position of the adjustable member 2 and regulate the driving force of the driving unit 3. As illustrated in FIG. 1, the preferred embodiment, the position sensing and controlling unit 8 is fixed in the opening 111 of the second sidewall 11b and configured adjacent to one of the magnets 31 on one side of the coil 32.

Furthermore, the position sensing and controlling unit 8 includes a position sensing member and a control unit (both not shown in FIGS.) The position sensing member detects the relative position of the adjustable member 2, the control unit regulates the driving force of the driving unit 3, and the position sensing member is a sensing member of magnetic field changes, light intensity changes, electric field changes, or stress changes.

Please refer to FIG. 2. The instant embodiment also has an image sensing module 7 which includes an image sensor 71, a flexible circuit board 72, and an optical filter 73. In the instant embodiment, the fixed member 1 is coupled proximate to an end of the flexible circuit board 72. The image sensor 71 resembles a plane and is fixed on a side of the flexible circuit board 72 facing the fixed member 1. The normal direction of the image sensor 71 is parallel to the optical axis. The optical filter 73 is arranged between the adjustable member 2 and the image sensor 71 and fixed at the bottom plate 13 proximate to a side of the image sensor 71 such that invisible light can be filtered out through the optical filter 73.

The lens module 9 is disposed on the adjustable member 2 and forms images of the target object onto the image sensor 71. Via the displacement of the adjustable member 2, the lens module 9 is therefore driven to focus on the target object accordingly such that images of the target object can be clearly formed and detected by the image sensor 71.

Preferably, the lens module 9 can be a pinhole lens, single-lens lens, standard lens, fixed focus lens, long-focus lens, short-focus lens, wide-angle lens or macro lens. The formation of images for the lens module 9 can be through pinhole imaging, single-lens reflective imaging, rangefinder, single lens imaging or complex lens imaging.

Figure 5:
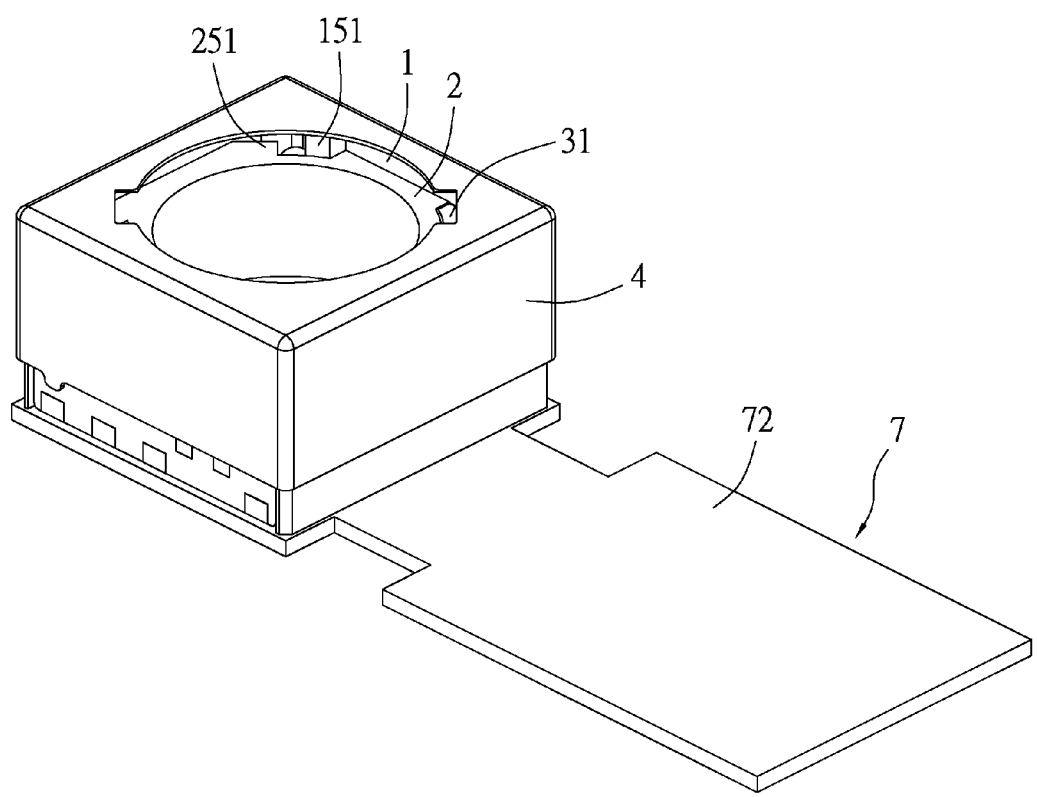
FIG. 5 is a perspective view illustrating the lens actuating device of the instant disclosure.

Please refer to FIG. 5 as a perspective view illustrating the lens actuating device of the instant disclosure. The cover 4 envelops the top surface and periphery of the fixed member 1. The cover 4 constrains the adjustable member 2 and the spheres B1, B2. The cover 4 is also formed with a cover opening 40 which corresponds to the lens module 9.

When impact forces are applied in directions other than the displacement of lens assembly, two columns of spheres B1, B2 which are abutted by the second guiding structure can offset the impact forces through the lens actuating device of the instant disclosure. As a result, the adjustable member 2 (lens module 9) maintains stable and parallel displacements along the optical axis.

The position sensing member 5 and the coil 32 are disposed at different sides of the magnets 31 such that the electromagnetic interference, generated by the current-induced force which is induced by the coil 32, to the signal of position sensing element 5 can be reduced. As a result, positioning accuracy and stability can be improved.

In the instant disclosure, the corner spacing defined by the substantially square shaped fixed member 1 and the substantially cylindrical shaped adjustable member 2 provides relatively well utility of space for the substantially triangular prism shaped magnets 31, which is advantageous to the miniaturization of camera systems or can retain lens module 9 of relatively larger diameter to provide relatively better optical performance.

The spheres B1, B2 of the instant disclosure can be directly disposed in the corners between the fixed member 1 and the adjustable member 2 for convenience after the fixed member 1 and the adjustable member 2 are assembled.

2$^{nd}$ Embodiment

The two corners as mentioned in the previous embodiment each has a column of spheres B1, B2 abutting a second guiding structure 25 to provide forces of various directions and accurately guide the displacement of the adjustable member 2 along the optical axis. Thus, a total of four columns of spheres provide the most preferred balance. However, the instant disclosure may be configured with the first, second guiding structures at one corner while the other corner is only configured with a column to provide supplementary balance.

Figure 6:
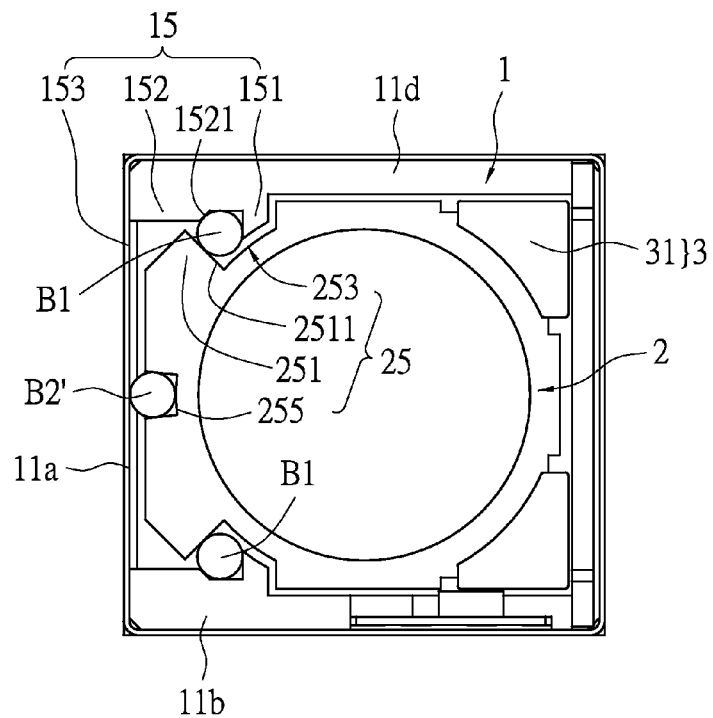
FIG. 6 is a top view illustrating the lens actuating device (without the cover) in accordance to the second embodiment of the instant disclosure.
Figure 7:
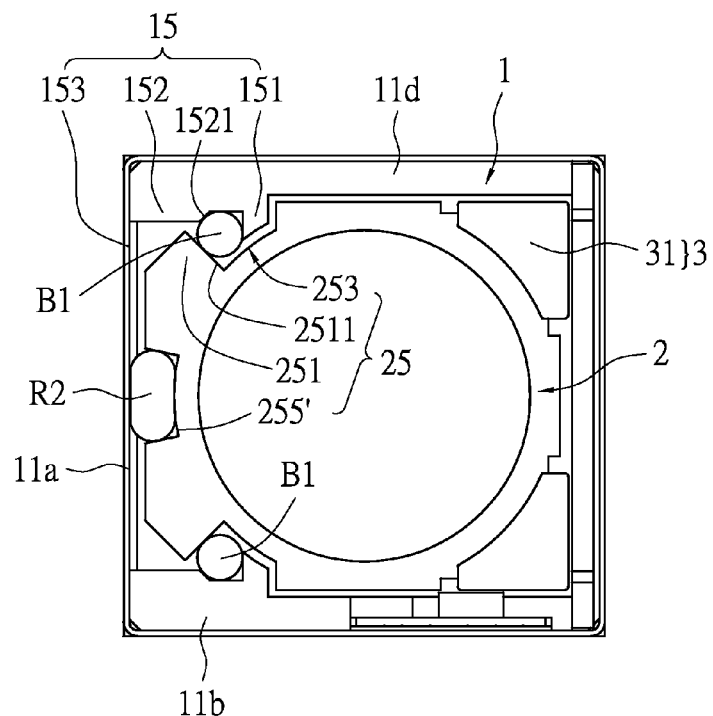
FIG. 7 is a top view illustrating the lens actuating device (without the cover) in accordance to the third embodiment of the instant disclosure.

The second embodiment of the instant disclosure only uses three columns of spheres to support the aforementioned configuration. Please refer to FIG. 6. The adjustable member 2 in the instant embodiment is formed with a slot 255 generally aligning with the center of the first sidewall 11a. The slot 255 retains another column of rolling member B2' (as spheres for example in the instant embodiment). The slot 255 can be formed as a portion of the second guiding structure 25 and jointly abut the corresponding rolling member B2' with the first sidewall 11a. When forces are exerted towards the first sidewall 11a onto the adjustable member 2, the column of spheres B2' provides forces directed towards the driving unit 3 and the third sidewall 11c, via the inner side 153 of the first sidewall 11a. When forces are exerted away from the first sidewall 11a onto the adjustable member 2, the first column of spheres B1 provides forces directed towards the first sidewall 11a. Since the first protrusion surface 2511 of the inner protrusion 251 is oblique, practically, the first column of spheres B1 near the top of FIG. 6 exerts forces onto the first protrusion surface 2511, including the force components that exert towards the first sidewall 11a and second sidewall 11b. The first column of spheres B1 near the bottom of FIG. 6 exerts forces including force components towards the first sidewall 11a and the force components towards the fourth sidewall 11d.

3<sup>rd</sup> Embodiment

The third embodiment differs from the second embodiment in that the rolling member R2' of the instant embodiment is cylindrical. The slot 255' is relatively wider according to the rolling member R2' in the instant embodiment.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. A lens actuating device, comprising:
   a fixed member;
   an adjustable member movably disposed in the fixed member along an optical axis and having a lens module disposed therein;
   a driving unit disposed between the fixed member and the adjustable member for providing a driving force to the adjustable member; and
   a movable support unit disposed at one side of the adjustable member opposite to the driving unit and having at least one first guiding structure formed on an inner side of the fixed member parallel to the optical axis, a second guiding structure formed on the periphery of the adjustable member corresponding to the first guiding structure, and a plurality of rolling members;
   wherein the rolling members are disposed between the first and second guiding structures configured into two rows to retain the seconding guiding structure such that the displacement of the adjustable member is constrained along the optical axis and prevented from offset towards or away from the driving unit.

2. The lens actuating device as recited in claim 1, wherein the adjustable member is substantially cylindrical, the fixed member substantially resembles a square, the periphery of the adjustable member and the fixed member are defined with four corners, and the movable support unit and the driving unit respectively flank the adjustable member.

3. The lens actuating device as recited in claim 1, wherein the fixed member is substantially quadrilateral defining a first sidewall, a second sidewall, a third sidewall, and a fourth sidewall opposite to the second sidewall, and the number of the first guiding structure is a pair and each is respectively formed on the first, second, and fourth sidewalls.

4. The lens actuating device as recited in claim 3, wherein the driving unit includes at least one magnet arranged on the outer surface of the adjustable member opposite to the second guiding structure and at least one coil firmly fastened on the third sidewall of the fixed member.

5. The lens actuating device as recited in claim 4, wherein each of the pair of first guiding structures has an outer protrusion respectively extending from the second and fourth sidewalls of the fixed member towards the adjustable member, the outer protrusions are configured between the driving unit and the rolling members, the second guiding structure has a pair of inner protrusions extending between the outer protrusions and the first sidewall, and the outer and inner protrusions jointly abut the corresponding rolling members to a row.

6. The lens actuating device as recited in claim 5, wherein each of the inner protrusions includes a first protrusion surface, the first protrusion surface and the outer protrusion jointly abut the corresponding rolling members to a row parallel to the optical axis.

7. The lens actuating device as recited in claim 6, wherein the first protrusion surfaces respectively and slantingly face the second sidewall and the fourth sidewall.

8. The lens actuating device as recited in claim 6, wherein each of the inner protrusions includes a second protrusion surface, the second protrusion surface, the first, second, and fourth sidewalls jointly abut the rolling members to a row parallel to the optical axis.

9. The lens actuating device as recited in claim 8, wherein the second protrusion surfaces slantingly face the first sidewall.

10. The lens actuating device as recited in claim 5, wherein each of the pair of first guiding structures further includes an auxiliary protrusion respectively extending from the second and fourth sidewalls of the fixed member towards the adjustable member, each of the auxiliary protrusions is configured between the inner protrusion and the first sidewall to jointly abut the corresponding rolling members.

11. The lens actuating device as recited in claim 10, wherein the auxiliary protrusion has an oblique surface facing towards the outer protrusion and opposite the inner protrusion, the oblique surface and the outer protrusion jointly abut the rolling members in a row.

12. The lens actuating device as recited in claim 3, wherein the second guiding structure is formed with a slot, the slot and the first sidewall jointly abut the corresponding rolling members.

13. The lens actuating device as recited in claim 12, wherein the slot is formed on the adjustable member substantially corresponding to the center of the first sidewall.

14. The lens actuating device as recited in claim 1 further comprising:
   a position sensing unit disposed proximate to the magnet, detecting the position of the adjustable member and providing signals regarding positions of the adjustable member.

15. The lens actuating device as recited in claim 1 further comprising:
   a position sensing and controlling unit disposed proximate to the magnet, detecting the position of the adjustable member and regulating the driving force of the driving unit;
   wherein the position sensing and controlling unit includes a position sensing member and a control unit, the position sensing member is a detector of magnetic field changes, light intensity changes, electric field changes, or stress changes, the position sensing member detects positions of the adjustable member and provides signals regarding the positions, and the control unit regulates the driving force of the driving unit according to the signals regarding the positions.

* * * * *